June 13, 1950 S. A. BROWN 2,511,326
ELECTRIC MOTOR CONSTRUCTION
Filed Oct. 16, 1947 2 Sheets-Sheet 1

INVENTOR
STEFFEN A. BROWN
BY
Toulmin & Toulmin
ATTORNEYS

INVENTOR
STEFFEN A. BROWN
BY
Toulmin & Toulmin
ATTORNEYS

Patented June 13, 1950

2,511,326

UNITED STATES PATENT OFFICE 2,511,326

ELECTRIC MOTOR CONSTRUCTION

Steffen A. Brown, Dayton, Ohio, assignor to The Brown-Brockmeyer Co., Dayton, Ohio, a corporation of Ohio Application October 16, 1947, Serial No. 780,290

6 Claims. (Cl. 172—36)

This invention relates to electric motors, and particularly to electric motors which are very compact in the axial direction thereof.

Many applications of electric motors are such that it is desirable to hold the length of the motor in the direction of the shaft to a minimum. Such applications include sanding machines, waxing machines, floor scrubbing machines and similar devices in which it is desirable for the machine to be compact in order to provide for the proper balance thereof, to have minimum height in order to enable the device to be used under varying conditions, and to provide for an assembly which is easily transported.

The ordinary type of electric motor is not especially adapted for this type of service due to its fairly long length, and it is a particular object of the present invention to provide an electric motor construction such that the axial length thereof is maintained to a practical minimum.

Another object of this invention is to provide for an electric motor construction which is unusually short in length but which nevertheless has good electrical characteristics.

A still further object is the provision of a motor construction in which a portion of the space usually occupied by the rotor of the motor is utilized for mounting a part of the auxiliaries for the motor.

These and other objects and advantages will become more apparent upon reference to the following description taken in connection with the accompanying drawings in which.

Figure 1:
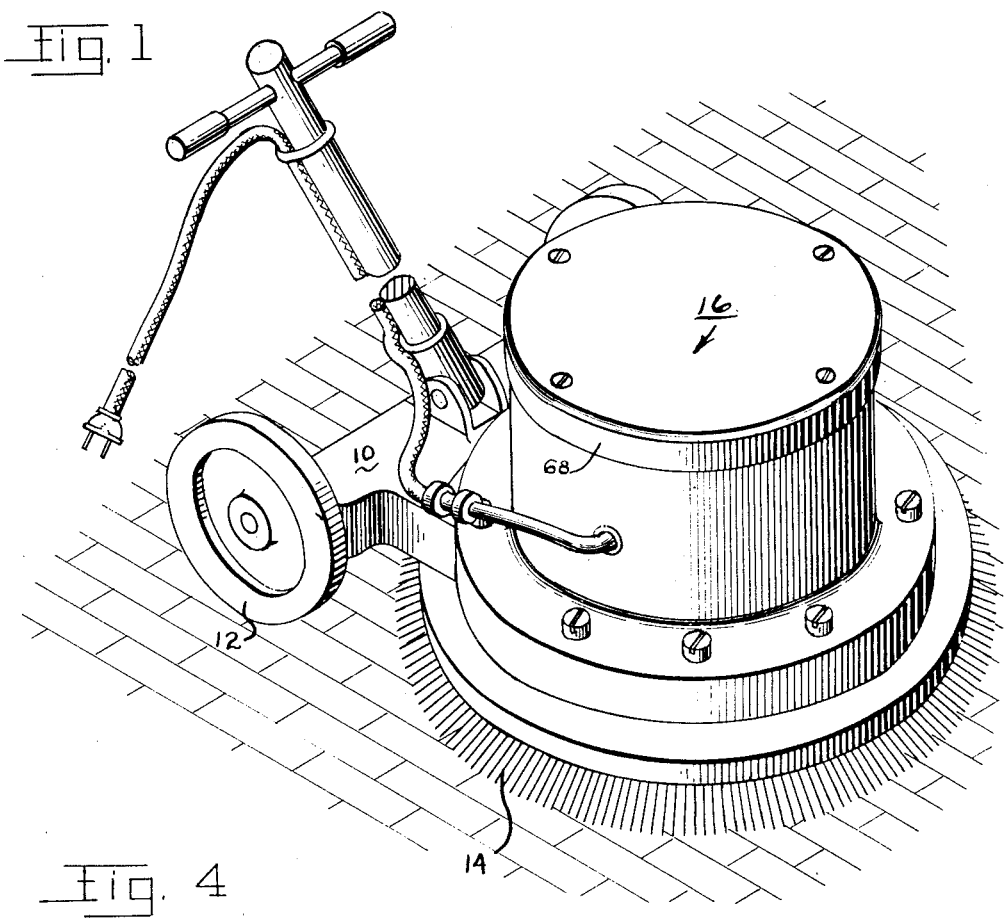
Figure 1 is a perspective view of a waxing machine or floor scrubber having a motor constructed according to this invention mounted therein.
Figure 4:
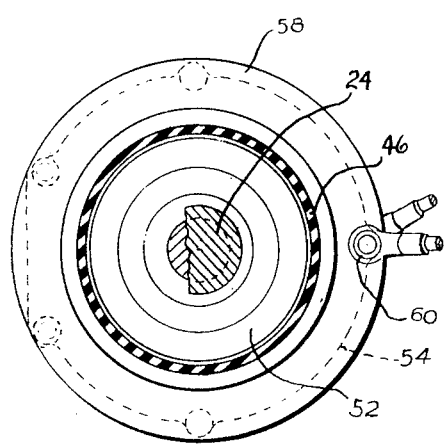
Figure 4 is a section indicated by the line 4—4 on Figure 2 and shows the appearance of the switch construction from the underneath side.
Figure 5:
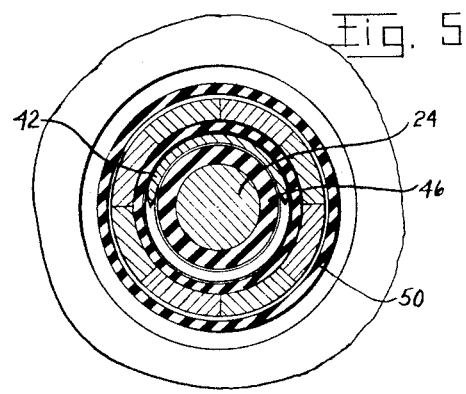
Figure 5 is a section indicated by the line 5—5 on Figure 2 and showing the arrangement of the actuating weights for the switch mechanism.

Referring to the drawings, Figure 1 shows a machine consisting of a frame 10 mounted on the wheels 12 and including a brush or other rotating member 14 carried on the said frame. The brush is adapted for being driven in rotation by a motor generally indicated at 16 and also mounted in the frame 10. Due to the nature of the service to which the machine is put it is necessary for the motor 16 to occupy as little height as possible. This permits the use of the machine where there is limited head room and makes for a more compact assembly.

Figure 2:
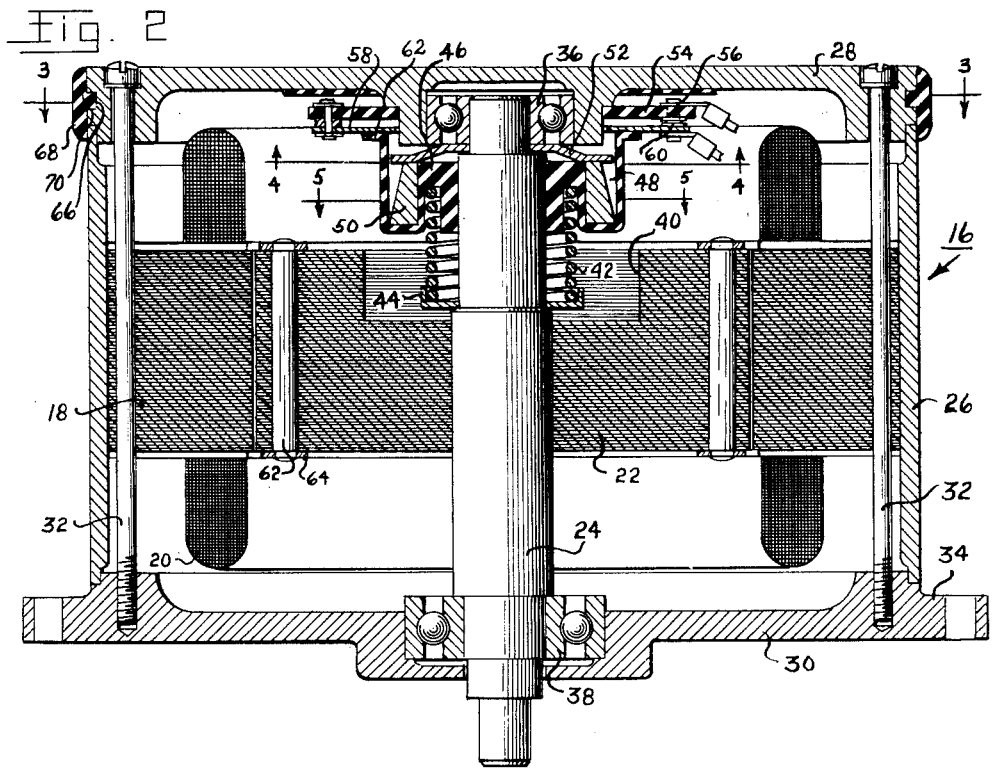
Figure 2 is a vertical section through the motor of Figure 1 showing more in detail the construction thereof.
Figure 3:
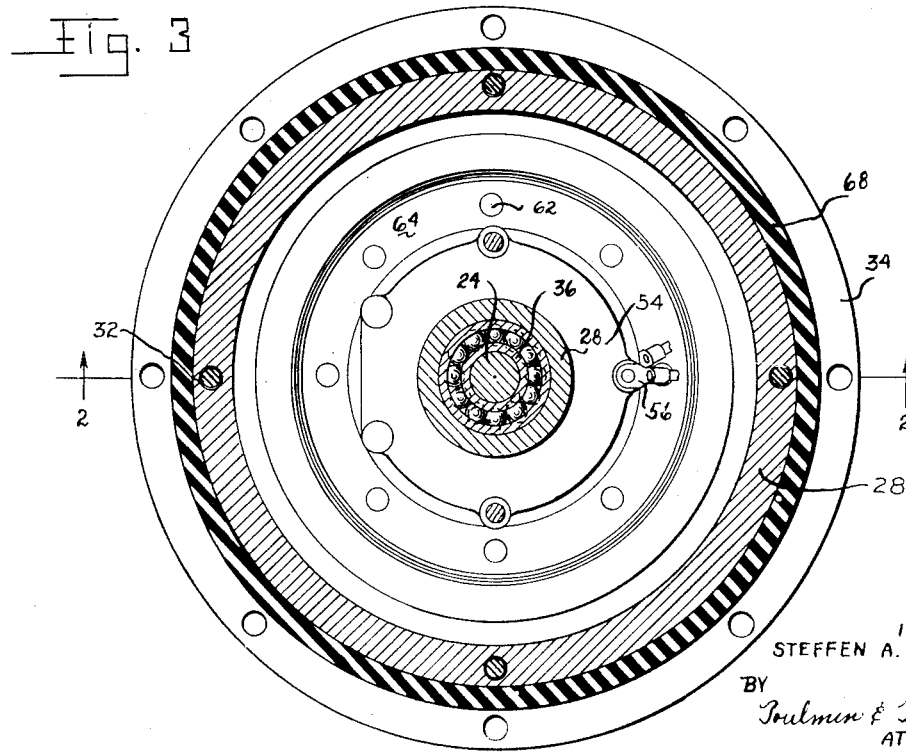
Figure 3 is a plan section indicated on the line 3—3 of Figure 2 and shows the arrangement of the switch mechanism in the motor and the mounting of a rubber guard around the upper edge of the motor.

The construction of the motor, by means of which its length is limited to a practical minimum, is better shown in Figure 2. In Figure 2 it will be seen that the motor consists of the standard electrical components consisting of a laminated stator 18 having the winding 20, and of a laminated rotor 22 which is mounted on a shaft 24. The stator 18 is pressed, or otherwise suitably rigidly mounted, in the motor frame 26 and mounted on the said frame is the upper end cover 28 and the lower end cover 30 which are interconnected by the through screws 32. Preferably the lower end cover is flanged as at 34 to provide means for mounting the assembly on the frame 10 of the machine shown in Figure 1.

The shaft 24 is journaled in the upper cover 28 by the bearing 36 and in the lower cover 30 by the bearing 38 in accordance with practices well known in the electric motor art.

The motor 16 is preferably a single phase motor, for practical and economical reasons, and is made self starting by an auxiliary winding in any of the several usual manners which comprise utilizing the auxiliary winding to establish a rotating field in the motor either by means of the inherent inductance of the starting winding, or by means of connecting a condenser in circuit therewith.

Usually, it is desirable to interrupt the circuit to the starting winding after the motor has come up to speed in order to eliminate a loss of power therein. This is accomplished by a switch means which is responsive to a predetermined motor speed for interrupting the starting winding circuit.

According to this invention, a switch means of this type is built into the motor but the axial length of the motor is not increased thereby because the said switch is at least partially telescoped into the motor rotor. This will be seen in Figure 2 wherein the rotor 22 is recessed as at 40 in order to receive the spring 42 of the switch actuator. The spring 42 bears against a cup shaped washer 44 carried on the shaft 24 and at its upper end engages the underneath side of a cup member 46 which is formed of insulating material, and which is preferably molded to shape.

The member 46 includes an annular channel 48 in which is mounted a plurality of weights 50. The weights 50 have their base portion of substantially the same width as the annular channel 48 and have their outer surfaces tapered inwardly. Thus, the centrifugal action of the weights will be such that they will pivot outwardly in the channel 48 against their lower and outer corners.

The upper ends of the weights 50 bear against a plate 52 which is mounted on the shaft 24 between the bearing 36 and a shoulder on the said shaft. It will be apparent that outward movement of the weights 50 in the manner mentioned before, will cause their effective length between the bottom of the channel 48 and the plate 52 to be increased so that the member 46 will move downwardly against the thrust of the spring 42.

For utilizing the aforementioned movement of the member 46 for interrupting the circuit to the starting winding, there is provided a disc 54 of insulating material which is mounted on the inside of the end cover 28 and which carries a contact 56. Mounted on the disc 54 is also a spring arm 58 which carries a contact 60 that is normally urged by the said spring arm away from the fixed contact 56. The two contacts 56 and 60 are in circuit with the starting winding of the motor and when engaged complete the circuit thereto.

The thrust of the spring 42 is such as to normally hold the member 46 in such a position that the flange 62 thereof will urge the spring arm 58 in a direction to bring the contacts 56 and 60 together. However, when the shaft 24 attains a predetermined speed of rotation, the weights 50 will throw out in the annular groove 48, thereby moving the member 46 downwardly and permitting the spring arm 58 to move the contacts 56 and 60 apart.

It will be apparent from Figure 2 that the switch mechanism described above does not increase the axial length of the motor. This is at least partially accomplished by recessing the rotor 22 as at 40. This recessing of the rotor does not detract from its electrical characteristics because sufficient iron remains around the outer portion thereof to provide the necessary magnetic paths. Also, the laminations of the rotor have no tendency to become disassembled due to the fact that the bars 62 of the squirrel cage winding thereof have their ends secured to the end rings 64 on each side of the rotor. The securing of the bars 62 to the end rings 64 may be accomplished by welding, brazing, casting, or, as shown, riveting and the resulting construction will retain the laminations rigidly together.

For preventing the upper corner of the motor from scratching furniture and walls, the upper cover 28 is provided with an annular groove 66 and mounted around the said cover is a rubber ring 68 having a tongue 70 disposed in the groove 66. This rubber ring acts as a bumper and prevents damage to articles which may be struck by the upper corner of the machine while it is in use.

From the foregoing it will be evident that this invention provides for an electric motor construction which is particularly compact in the axial direction thereof thereby ideally adapting it for use in connection with machines such as floor scrubbers and the like wherein it is desired to provide for an assembly having a minimum height. The arrangement of the motor wherein the centrifugal switch mechanism is telescoped with the rotor is such that the electrical characteristics of the motor are not impaired.

It will be understood that this invention is susceptible to modification in order to adapt it to different usages and conditions, accordingly, it is desired to comprehend such modifications within this invention as may fall within the scope of the appended claims.

I claim:

1. In an electric motor, a rotor having a shaft therethrough, a shouldered end on said shaft, a recess in said rotor around said shaft and on the same side of said rotor as the shouldered end of said shaft, a bearing on the said one end of said shaft, a plate mounted on said shaft beneath said bearing and against said shoulder, a cup slidable on said shaft and opening toward said plate, weights in said cup bearing against said plate and movable outwardly from said shaft for moving said cup away from said plate, and spring means around said shaft and bearing on the closed side of said cup for urging said cup toward said plate, said spring extending into the recess in said rotor.

2. In combination in an electric motor having a stator with running and starting windings, a motor frame in which said stator is mounted, a rotor within said stator and having a shaft, a shouldered end on said shaft, a bearing pressed on the end of the shaft and a plate btween the bearing and the shoulder on the shaft, a switch in circuit with said starting winding, a centrifugal actuator for said switch carried by said shaft and including a cup member opening toward said plate, a spring bearing on the side of said member opposite said plate and weights in said cup member bearing against said plate, said weights being movable radially outwardly in said member for moving said member away from said plate, and a recess extending part way through said rotor and surrounding said shaft for receiving at least the spring part of said switch mechanism.

3. In a motor construction, a stator having running and starting windings, a motor frame in which said stator is mounted, a flanged lower end cover secured to said frame, an upper end cover secured to said frame, means securing said covers to said frame, a rotor mounted in said stator and having a shaft, bearings on said shaft on opposite sides of said rotor and receivable in said end covers, switch means carried by one of said covers and in circuit with said starting winding, a centrifugal actuator for said switch responsive to a predetermined speed of rotation of said rotor for opening said switch and mounted on said shaft between one of said bearings and said rotor and retained in position by the said one bearing, said actuator including a cup member slidable on said shaft having a circumferential flange for engagement with said switch means and a spring surrounding said shaft and urging said member toward said switch means, and a recess in said rotor extending part of the way therethrough and surrounding said shaft and adapted for telescopically receiving at least a portion of said switch actuator including said spring.

4. In an electric motor, a motor frame including a stator and end covers, said stator having windings and said end covers being mounted on the frame closely adjacent the outer edges of said windings, a rotor in said motor having a shaft, bearings on said shaft on opposite sides of said rotor receivable in said end covers, at least one of said end covers having an inwardly extending bearing boss for receiving the adjacent shaft bearing, a switch mechanism carried by said one of said end covers and surrounding said bearing boss, a centrifugally operated actuating mechanism for said switch mechanism mounted on said shaft between the one of said bearings in said bearing boss and said rotor and retained in assembled relation with the rotor by the said bearing, and a recess extending into the side of said rotor adjacent said actuating mechanism surrounding said shaft, the said actuating mechanism including a spring extending into said recess.

5. In an electric motor having a motor frame with a stator mounted therein, a rotor receivable in said stator and a shouldered shaft supporting said rotor, a recess in one side of said rotor surrounding said shaft, a bearing press-fitted on the shouldered end of said shaft at the recessed side of said rotor, a plate between said bearing and shoulder, a centrifugal switch actuating means mounted on said shaft between said plate and the bottom of said recess and including a member slidable on said shaft and a spring continuously urging said member in one direction, an end cover for said frame having a bearing recess therein adapted for receiving said bearing, a switch carried by said end cover around said bearing recess, and means responsive to movements of said member on said shaft for actuating said switch.

6. In an electric motor, a rotor having a shaft extending therethrough, a shouldered end on said shaft, a recess in said rotor surrounding said shaft and on the same side of said rotor as the shouldered end of said shaft, said recess extending partly through said rotor, a bearing on the end of said shaft and positioned by the shoulder on the said shaft, a plate mounted on said shaft and bearing against the inner end of said bearing, a cup sliable on said shaft and opening toward said plate, weights in said cup bearing against said plate, and movable outwardly from said shaft for moving said cup away from said plate, spring means around said shaft and bearing on the closed side of said cup for urging the same toward said plate, said spring extending into the recess in said rotor, a second shoulder on said shaft adjacent the bottom of the said recess in said rotor, and a second plate mounted on said shaft against said second shoulder and against which the inner end of said spring bears.

STEFFAN A. BROWN.

REFERENCES CITED

The following references are of record in the file of this patent:

UNITED STATES PATENTS

| Number | Name | Date |
|---|---|---|
| 919,523 | Barker | Apr. 27, 1909 |
| 977,591 | Branson | Dec. 6, 1910 |
| 1,710,180 | Moore | Apr. 23, 1929 |
| 1,780,339 | Canton | Nov. 4, 1930 |
| 2,282,249 | Schoelchin | May 5, 1942 |